United States Patent
Thompson

[15] 3,647,471
[45] Mar. 7, 1972

[54] PHOTOGRAPHIC REPRODUCTION OF HALFTONE SCREENS

[72] Inventor: Edward R. Thompson, North Hollywood, Calif.

[73] Assignee: Lockheed Aircraft Corporation, Burbank, Calif.

[22] Filed: Nov. 19, 1969

[21] Appl. No.: 878,087

[52] U.S. Cl. ............................................................96/116
[51] Int. Cl. ............................................................G03f 5/00
[58] Field of Search ..................................................96/116

[56] References Cited

UNITED STATES PATENTS

| | | | |
|---|---|---|---|
| 2,183,204 | 12/1939 | Reynolds | 96/116 |
| 2,719,790 | 10/1955 | Monray | 96/116 |
| 2,468,680 | 4/1949 | Marx | 96/116 |
| 2,566,265 | 8/1951 | Tuttle | 96/116 X |
| 2,757,087 | 7/1956 | Wicklund | 96/116 X |
| 426,283 | 4/1890 | Kohl | 96/116 X |
| 492,333 | 2/1893 | Levy | 96/116 |

*Primary Examiner*—David Klein
*Attorney*—George C. Sullivan and Ralph M. Flygare

[57] ABSTRACT

The method of making, and article of manufacture therefor, of a photographic master wherein an unexposed sheet of orthochromatic film is secured to a rotatable drum, moving the drum longitudinally during rotation, and permitting a narrow light source to be exposed to the film resulting in a sheet of film having a series of extremely close parallel lines, and developing the film. The method of making, and article of manufacture therefor, of a halftone screen wherein an unexposed sheet of orthochromatic film is placed adjacent a photographic master, exposing the master onto the film, removing and replacing the master so that the lines of the master are at 90° to the first position, exposing again the film, and developing the film. The method of making and article of manufacture therefor of a halftone screen wherein an unexposed sheet of orthochromatic plate is placed adjacent a photographic master, exposing the master onto the plate, developing the plate, repeating the procedure to a second plate, placing the two exposed plates adjacent with the lines at 90°.

2 Claims, 8 Drawing Figures

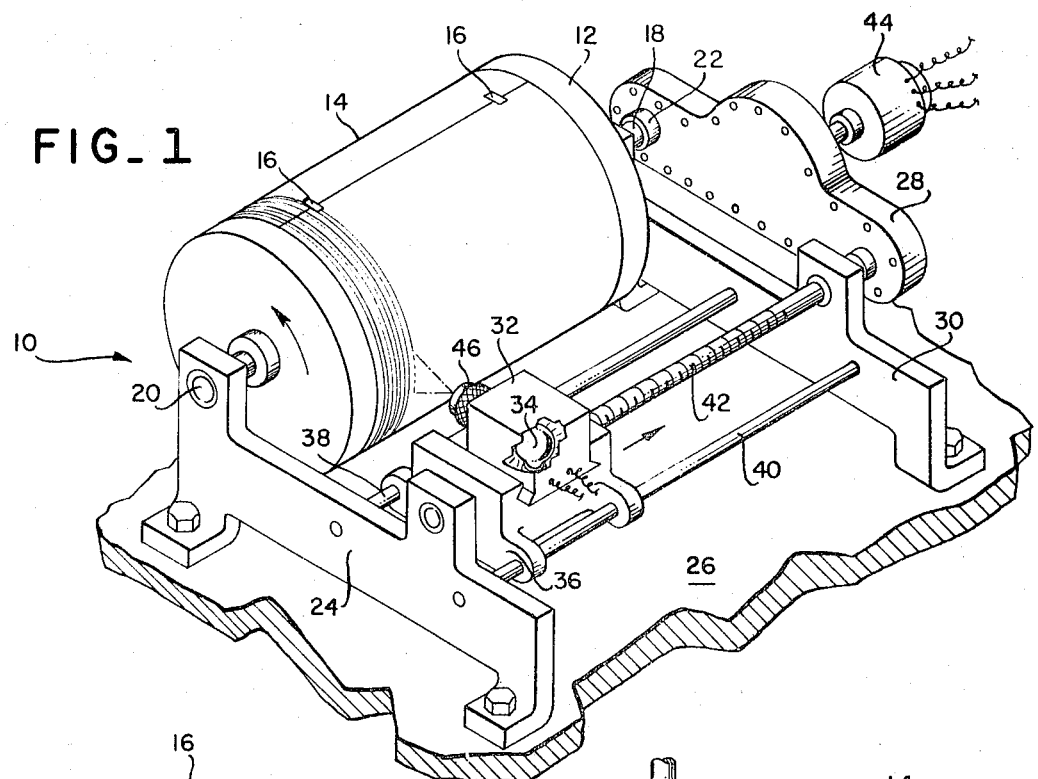
FIG_1
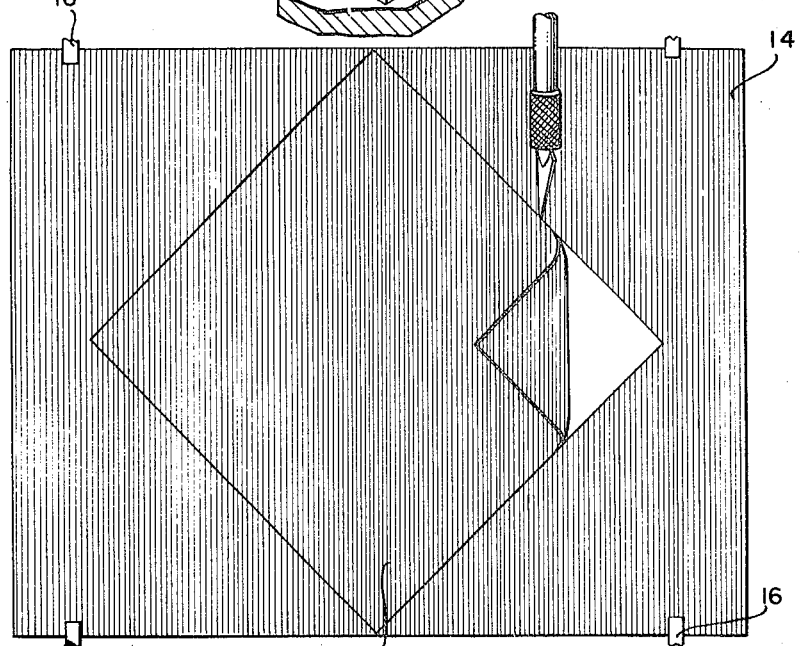
FIG_2
INVENTOR.
EDWARD R. THOMPSON

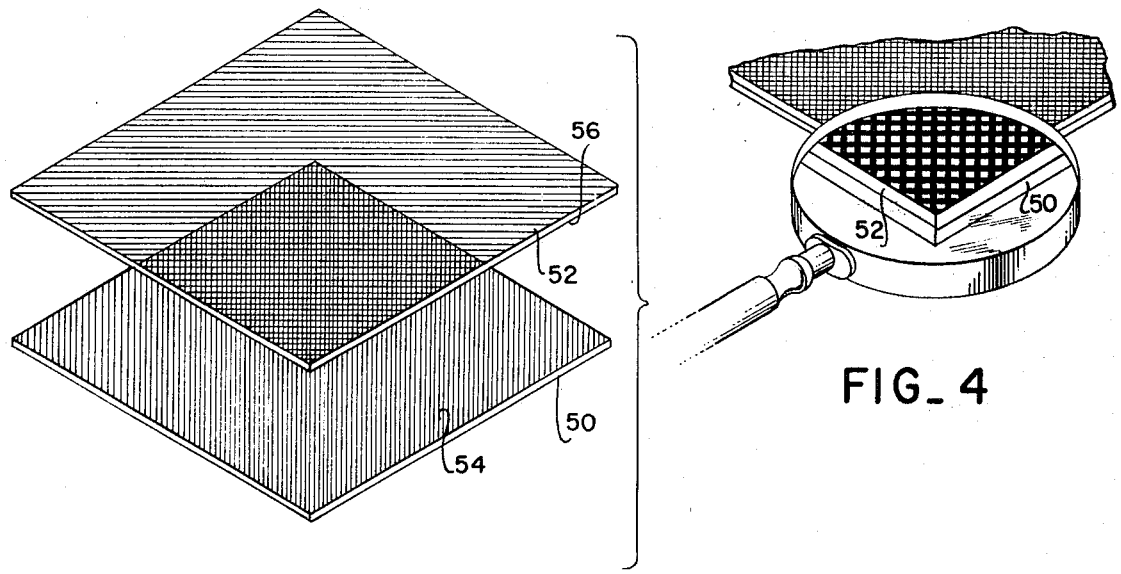
FIG_3  FIG_4
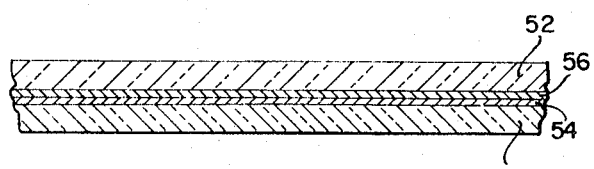
FIG_6
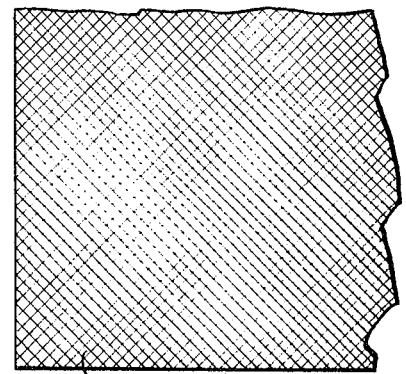
FIG_5
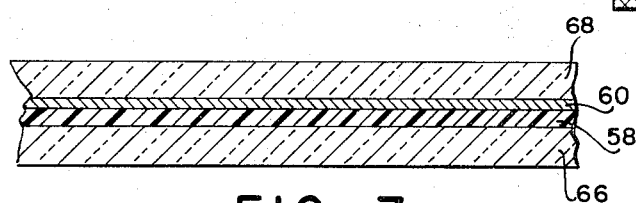
FIG_7
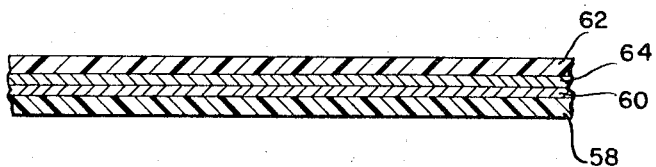
FIG_8

3,647,471

PHOTOGRAPHIC REPRODUCTION OF HALFTONE SCREENS

BACKGROUND OF THE INVENTION

The field of this invention relates to halftone screens for the reproduction of images by printing or like duplicating processes. Specifically, the field of this invention relates to a method of producing a halftone screen and the resulting produced halftone screen.

In the reproduction of images, such as photographic prints or negatives by printing or like duplicating processes, it has been customary to produce halftone engravings, that is, engraving plates having a "screen" structure composed of a series of regularly spaced dots. In such halftone screens, the average size and spacing of the dots in each incremental portion of the plate vary proportionately with the average shade value or greyness of the corresponding portion of the image. The surfaces of these dots lie in the original plane of the screen and receive the printing ink from a roller or the like.

Such halftone screens and their method of manufacture are well known in the art, so that no detailed description is required here. However, it is also well known that the process of making such photoengravings involves elaborate and expensive equipment and a large number of steps, each of which must be performed with great care and skill in order to obtain a satisfactory halftone screen. Such skill is generally acquired only be extended apprenticeship and artisans of the required skill are frequently unavailable. All of the foregoing factors contribute to the high cost of such halftone plates and to the time required for their completion.

One of the most widely employed methods of manufacture of a halftone screen is to draw each of the lines upon a sheet of glass and then to etch by acid the entire sheet. As halftone screens usually have anywhere from 50 lines per inch to 300 lines per inch, it is readily apparent that the scribing method would be quite time consuming. Actually, to make an average size screen it would take a skilled artisan approximately 1 full week in time to make a halftone screen using the scribing method. Another disadvantage of the scribing method is that if a mistake is made upon the glass sheet, frequently the entire sheet has to be discarded. If the mistake can be corrected, such is very difficult as well as extremely time consuming.

It would be of particular advantage to be able to produce halftone screens avoiding the conventional costly procedure of scribing the lines directly upon a sheet of glass.

SUMMARY OF THE INVENTION

This invention pertains to the method of making and articles of manufacture of halftone screens through the process of photography. It is first necessary to make a photographic master from which the halftone screens are formed. The master is formed by placing an unexposed sheet of film upon a drum and rotating the drum at a constant predetermined velocity. A light source which produces a beam of light the thickness of the line to be produced, is exposed upon the film. Then, expose the light source to the film and continuously move the light source longitudinally along the length of the film Remove the film from the drum, develop the film, thereby producing a section of film with a plurality of closely spaced parallel lines. Shape the section of film into a square with the sides of the square being at a 45° angle with the lines.

To produce a halftone screen from an orthochromatic glass plate, an unexposed plate is placed in contact with the master. Expose the master onto the plate by means of a light source, thereby producing a plate with a plurality of closely spaced parallel lines when developed. Repeat the procedure with another plate. Place the plates together forming a right-angled grid pattern.

To produce a halftone screen from a section of orthochromatic film, an unexposed section of film is placed in contact with the master. Expose the master onto the film by means of a light source. Remove the master and replace it at an angular displacement of 90° to the first position. Expose the film again by means of the light source. Remove the master, develop the film thereby producing a single section of film with a square grid pattern.

One of the objects of this invention is to provide a method of making a halftone screen which is much faster than heretofore possible while still maintaining the quality of the screen.

Another object of this invention is to provide an inexpensive method of producing halftone screens and plates.

Another object of this invention is to provide a halftone screen which facilitates the correction of mistakes as opposed to the conventional scribing method obtained screens.

BRIEF DESCRIPTION OF THE DRAWING

FIG. 1 is a perspective view of the rotatable drum and light source apparatus to be employed to produce a photographic master which is to be used to make halftone screens and plates;

FIG. 2 is a plan view of the section of film to produce a photographic master showing the manner in which the master is formed therefrom;

FIG. 3 is an exploded perspective view of the plate composite type of halftone screen;

FIG. 4 is a magnified perspective view of a portion of the composite of FIG. 3;

FIG. 5 is an enlarged portion in plan view of the film type of halftone screen;

FIG. 6 is a cross-sectional view through the orthochromatic plate composite type of halftone screen;

FIG. 7 is a cross-sectional view through the orthochromatic film type of halftone screen being retained between a pair of clear glass plates; and FIG. 8 is a cross-sectional view through the contacting relationship of the master and film to expose the master upon the film.

DETAILED DESCRIPTION OF THE SHOWN EMBODIMENTS

Referring particularly to the drawings, there is shown in FIG. 1 one form of apparatus 10 which can be employed to produce a photographic master of the type employed in the invention. It is to be understood that a photographic master is an exposed rectangular sheet of transparent film, with a plurality of parallel black lines ruled thereon at a 45° angle to the longest dimension. The lines are equal in width with the result being 50 percent black (opaque) lines and 50 percent open (transparent) space. Masters can range from 25 lines per inch to 300 lines per inch. A photographic master of 85 lines per inch is used in the method of the invention to produce an 85-line halftone screen. It is to be further understood that the apparatus 10 is only one of several different readily available devices which could be employed to make photographic masters of the type herein considered. The apparatus 10 itself forms no part of the claimed invention.

Upon drum 12 a strip of unexposed photographic film 14, preferably of the orthochromatic type, is wound with the ends thereof held together by adhesive tape 16. It should be understood that the process is carried out in darkness or other ambient conditions appropriate to the handling of unexposed photographic films. Drum 12 is rotatable by shaft 18 within fore bearing 20 and aft bearing 22. Fore bearing 20 is retained within a fore stanchion 24 supported upon surface 26. Aft bearing 22 is retained with gear housing 28 which is supported upon an aft stanchion 30 which is also supported upon surface 26. An optical head 32 containing a light source 34 is supported upon an optical head housing 36. Housing 36 is slidably supported upon guide rods 38 and 40 which are held within stanchions 24 and 30. Optical head 32 may be translated along rods 38 and 40 by a leadscrew 42 which is rotatably supported within stanchions 24 and 30. Leadscrew 42 is rotated by an appropriate gear mechanism (not shown) within gear housing 28. The rotation of screw 42 and drum 12 are synchronized through the gear mechanism to provide a predetermined number of lines per inch on the master 14. A single motor 44 provides rotation of both the drum and leadscrew 42. The lens 46 is masked to form a narrow beam of light having a width corresponding to the desired line width on the master 14.

To produce a photographic master, with a strip of unexposed film 14 upon drum 12 and the optical head 32 located at the far left edge of the film 14, the light source is activated. By "film" is meant a thin, flexible, transparent, optically uniform sheet upon which is carried a coating comprising a light-sensitive emulsion. Motor 44 is activated causing drum 12 and leadscrew 12 to rotate. The beam of light through the masked lens 46 exposes a line on the film. Rotation of drum 12 and screw 42 is continuous until the entire strip of film 14 is exposed. With the film 14 fully exposed, it is removed from drum 12 and developed by conventional developing techniques. It has been found that to facilitate ease of use of the master 14, the master is formed in the shape of a square 48 (or rectangle) with the edges thereof at 45° to the ruled lines upon the film 14.

The photographic master may now be used to produce a halftone screen in accordance with the method of the invention. To produce a halftone screw from a pair of glass orthochromatic plates, one such plate 50 is placed in a vacuum frame, with its photosensitive emulsion 54 side up. The plate 50 is of the standard and well-known type used in professional photography. The photographic master 14 produced in the manner described in the preceding paragraph is placed upon the plate 50, emulsion side down. Remove the air from the vacuum frame. The vacuum frame may be of any suitable and well-known construction, such as is conventionally used in making photolitho plates and the like. Expose the master 14 and plate 50 to a light source. The type of light source or time of exposure is a matter of choice, it only being required that complete exposure occur, not insufficient or excess exposure. Insufficient exposure will cause the lines to be thin and light in color. Excess exposure will cause the lines to become blurred and not definite at the edges. Open the vacuum frame to the air and remove the photographic master and the exposed orthochromatic plate 50. Develop the plate by conventional methods and dry. A second glass orthochromatic plate 52 is then prepared in the manner just described. The pair of plates thus formed, and having identical line ruling, are then combined into an integral structure. To accomplish this, place the first plate 50 in a wooden rack with the emulsion 54 side up. Cover the plate 50 with a transparent adhesive such as Canada Fir Balsam (Balsam has substantially the same index of refraction as glass). Place the second plate 52 on top of the Balsam with emulsion 56 side down. Press out excess Balsam and let dry until the plates 50 and 52 are cemented together. Remove the plates 50 and 52 from the rack and place a metal binding around all four edges of the resulting halftone screen. The screen is now ready for use.

A second embodiment of the invention utilizes a photosensitive emulsion supported on a plastic sheet (viz, conventional orthochromatic film) in lieu of sensitized glass plates. To form a halftone screen from orthochromatic film, place an unexposed sheet of orthochromatic film 58 in a vacuum frame, emulsion 60 side up. Place the photographic master 62 emulsion 64 side up. Place the photographic master 62 emulsion 64 side down upon the film (emulsion to emulsion). Activate the vacuum frame. Contact print by exposing the orthochromatic film from a light source through the photographic master 62. Return air to the vacuum frame. Pick up the master 62 and turn it over. The film 58 and the master 62 will not now be emulsion-to-emulsion. Because the ruled lines of the master 62 are ruled at a 45° angle with respect to the edges of the master 62 by turning the master 62 over the lines of the master 62 are now 90° to the exposed lines upon the film 58. Again remove the air from the vacuum frame and reexpose the master 62 upon the film 58, keeping the exposure times exactly the same. Return air to the frame, remove and store the master 62, and develop the film 58. After the film 58 is dried at room temperature, place the film 58 upon a sheet of polished plate glass 6 covered with Canada fir Balsam, or other suitable optical cement, located within a wooden rack. Place the cement on the free side of film 58 and place another piece of polished plate glass 68 upon the film 58. Remove excess cement and permit to dry. Remove the film 58 and glass 66 and 68 from the rack and place a metal binding around the four edges of the resulting halftone screen. The photographic halftone screen is now ready for use.

While the foregoing examples refer to "orthochromatic" film (this being the preferred type) it should be understood that other types of sensitized emulsions may be employed, as will be obvious to those versed in the art. High contrast, fine grain emulsions are preferred.

The screens produced by the method of this invention are superior to those produced by direct contact-printing copying of halftone screen masters, by reason of the fact that unlike prior screens the square "dots" do not have rounded corners which would degrade the resolution.

What is claimed is:

1. The method of making a halftone screen comprising the steps of:

placing a strip of unexposed photographic film about the periphery of a rotatable drum;

rotating said drum and said film about the axis of said drum;

directing a narrow, fixed intensity, beam of light onto the rotating film;

longitudinally moving said light beam, with respect to said axis, in synchronism with the rotation of said drum so as to expose side-by-side lines on said strip of film which are spaced apart by a distance equal to the width of said line;

removing the exposed film strip from said drum and developing said film strip so as to provide a photographic master having alternating opaque and transparent parallel lines;

placing said photographic master upon a first unexposed orthochromatic glass photographic plate;

contact printing the line pattern of the photographic master onto said first plate;

removing said photographic master from said first plate;

placing said photographic master upon a second unexposed orthochromatic glass photographic plate;

contact printing the line pattern of said photographic master onto said second plate;

removing said photographic master from said second plate;

developing the first and second plates so as to provide a pair of plates having alternating opaque and translucent parallel lines thereon; and cementing emulsion surfaces of said first and second developed plates together, with a transparent adhesive having substantially the same index of refraction as said glass, in confronting contact so that the line patterns of each are substantially orthogonal with respect to one another.

2. The method of making a halftone screen comprising the steps of:

placing a strip of unexposed photographic film about the periphery of a rotatable drum;

rotating said drum and said film about the axis of said drum;

directing a narrow, fixed intensity, beam of light onto the rotating film;

longitudinally moving said light beam, with respect to said axis, in synchronism with the rotation of said drum so as to expose side-by-side lines on said strip of film which are spaced apart by a distance equal to the width of said line;

removing the exposed film strip from said drum and developing said film strip so as to provide a photographic master having alternating opaque and transparent parallel lines;

placing said photographic master upon a sheet of unexposed photographic film in a first orientation;

contact printing the line pattern of said photographic master onto the unexposed film sheet;

relocating said photographic master upon said film sheet so that the line pattern of said photographic master is orthogonal with respect to the first orientation;

thereafter contact printing said photographic master in its relocated position onto said film sheet;

removing said photographic master from said film sheet; and, developing the photographic film sheet so as to provide a screen of orthogonally aligned opaque lines with transparent intertices.

* * * * *